(12) United States Patent  (10) Patent No.: US 6,483,440 B1
Welch  (45) Date of Patent: Nov. 19, 2002

(54) BEVERAGE HOLDER WITH REMOTE CONTROL

(76) Inventor: Scott D. Welch, 11528 Amir Ct., Redding, CA (US) 96003

( * ) Notice: Subject to any disclaimer, the term of this patent is extended or adjusted under 35 U.S.C. 154(b) by 0 days.

(21) Appl. No.: 09/227,477

(22) Filed: Jan. 8, 1999

Related U.S. Application Data

(63) Continuation of application No. 08/558,797, filed on Nov. 15, 1995, now abandoned.

(51) Int. Cl.⁷ .............................................. G08C 19/00
(52) U.S. Cl. .................. 340/825.72; 341/176; 455/344; 248/311.2
(58) Field of Search ....................... 340/825.72, 825.69; 220/737; 222/1, 28, 30, 36, 37, 39; 248/229.26, 230.7, 311.2; 455/344, 350, 351

(56) References Cited

U.S. PATENT DOCUMENTS

| D211,352 S | 6/1968 | Bornschlegal .............. D14/218 |
| 3,906,369 A | 9/1975 | Pitman et al. ............... 325/111 |
| D279,291 S | 6/1985 | Ueda ............................ D14/77 |
| 4,792,994 A | 12/1988 | Aylward ....................... 455/344 |
| D300,030 S | 2/1989 | Barrett et al. .............. D14/218 |
| D300,495 S | 4/1989 | Minuti .......................... D7/70 |
| 4,855,746 A | 8/1989 | Stacy ........................... 341/176 |
| 5,070,539 A | 12/1991 | Cheng .......................... 455/344 |
| 5,117,460 A | 5/1992 | Berry et al. ................... 381/41 |
| D331,409 S | 12/1992 | Goldsmith et al. ......... D14/218 |
| D338,673 S | 8/1993 | Lewis ......................... D14/218 |
| 5,257,765 A | 11/1993 | Halle ....................... 248/222.1 |
| D348,268 S | 6/1994 | Chambers ................... D14/218 |
| 5,333,823 A | 8/1994 | Joseph ......................... 248/146 |
| 5,423,509 A | 6/1995 | LaPorte et al. ........... 248/311.2 |
| 5,534,865 A | 7/1996 | Kriegsman et al. ......... 341/176 |
| 5,536,196 A | 7/1996 | Sternberg ..................... 446/81 |
| 5,598,162 A | 1/1997 | Terashima et al. .......... 341/176 |
| 5,605,312 A * | 2/1997 | Elder et al. .............. 248/230.7 |

* cited by examiner

Primary Examiner—Michael Horabik
Assistant Examiner—William Bangachon
(74) Attorney, Agent, or Firm—Coudert Brothers LLP

(57) ABSTRACT

An insulated container for the consumption of hot or cold beverages with an integral remote controller capable of operating an entertainment center, television or other system.

11 Claims, 2 Drawing Sheets

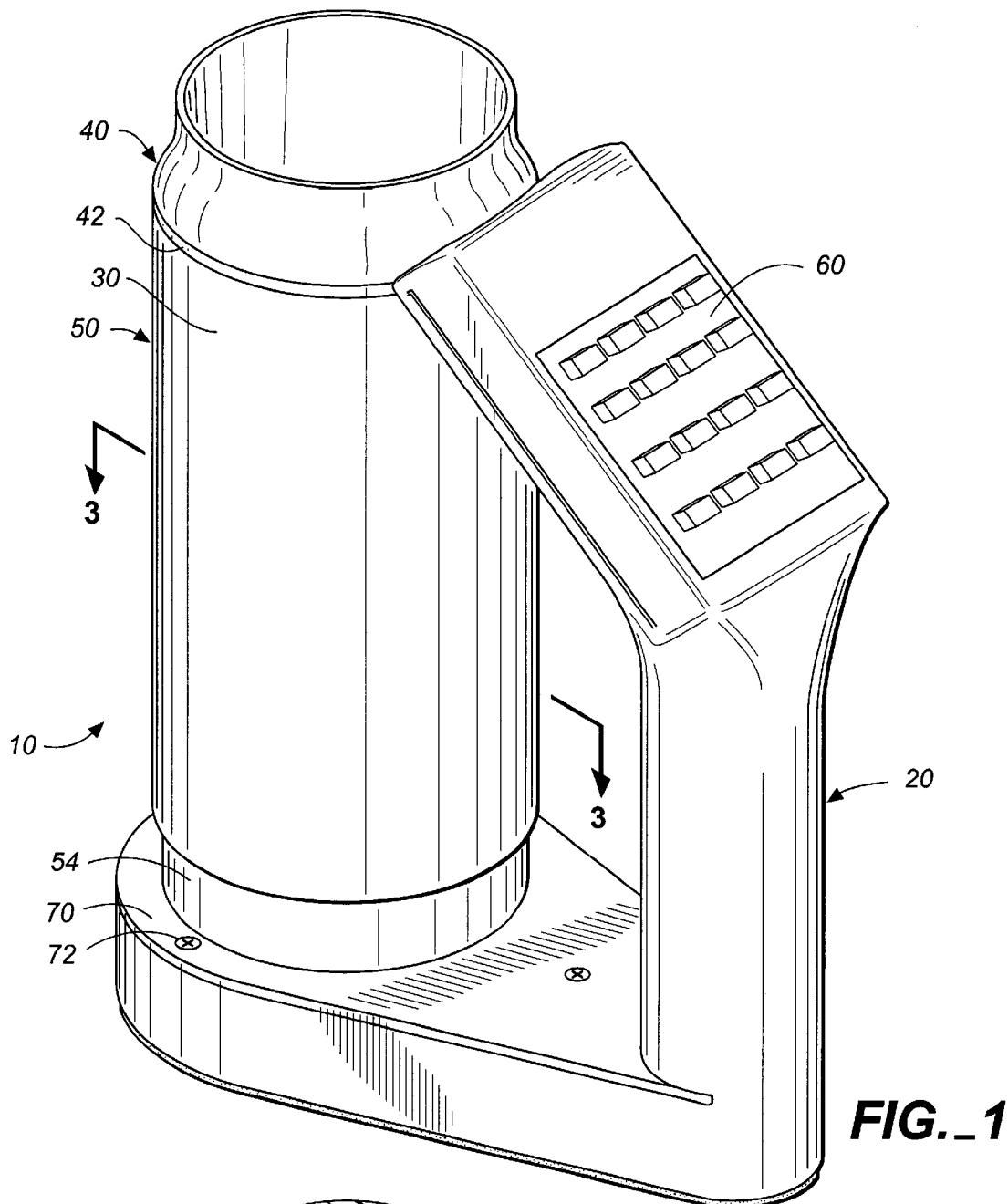
FIG._1
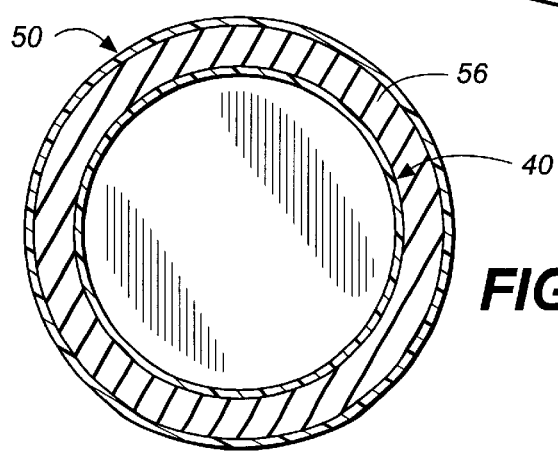
FIG._3

US 6,483,440 B1

BEVERAGE HOLDER WITH REMOTE CONTROL

CROSS REFERENCE TO RELATED APPLICATIONS

This application is a continuation of U.S. patent application Ser. No. 08/558,797, filed Nov. 15, 1995 (Abandoned).

FIELD OF THE INVENTION

The present invention deals with items in the field of consumer electronics and housewares.

BACKGROUND OF THE INVENTION

Common to today's lifestyle, more and more consumer electronics and other systems are controlled by users remotely. Televisions, compact disc players, entire home entertainment centers and even environmental controls are automated in such a way as to allow convenient control. The entertainment center has virtually become the hub of many households, where children watch educational programs or cartoons, parents obtain news or watch prime time television, and even shop. Digitized sound and pictures and a shrinking world have led to family rooms being windows to the world of both reality and escape. Lounging recliners, television trays for consuming food and beverage, and other accessories have allowed all manner of living or habitation to be accomplished in front of the television or home entertainment center. People today eat, sleep, and work in front of their televisions.

One typical example of an accessory which facilitates the aforementioned phenomenon is the television remote control. While the remote control is convenient, it is not a hands free method of control. When used as originally designed, the remote control requires the use of one hand, temporarily preventing the use of that hand for any other function.

It is usual for persons to use the hand they are most coordinated with to operate remote controls ("remote"). Specifically, a right-handed person will typically use the right hand to operate a remote, and a left-handed person will typically use the left hand to operate a remote. In fact, many people will use their "favored hand" to perform almost all single-handed tasks; the other less favored hand being used predominantly when tasks requiring the use of both hands are performed. One reason people use their favored hand when operating a remote is that a general pointing of the remote is required in order to situate the infrared beam commonly employed by remote controls onto the receiving means of the television or other system to be controlled. People are just generally more comfortable using their favored hand for such tasks.

Other tasks are also performed using the favored hand, right or left, such as eating, drinking or smoking. These activities of everyday life are performed continually in front of the home entertainment center or television by virtue of the lifestyle phenomenon previously described. Consequently, when one of these tasks is being performed, and a person wishes to operate a remote, the typical action is to stop what the person is doing, such as using a fork or holding a glass, putting that item down in order to pick up the remote and operate the television or system.

Such actions are even more cumbersome and annoying for disadvantaged persons having only one hand, and who must continually stop whatever manual activity they are engaged in to handle a remote. With the continuing application of technology to find more convenient ways to eliminate unnecessary tasks or steps, thereby simplifying everyday life, the time has come for devices which eliminate the need to cease repetitive everyday activities in order to operate remotely controlled systems.

Of the many manual tasks typically performed in front of a television or home entertainment center, a primary task is the raising and lowering of a cup or glass in order to consume beverages. Exemplary is the drinking of morning coffee while watching the news, or of enjoying a cold beer during a sports telecast. The frequency with which an activity such as drinking in front of the television takes place can be appreciated merely by realizing the number of soft-drink, beer and coffee commercials viewers are exposed to. For the viewer who employs a remote to operate his or her television or entertainment center, this means putting down a drink time after time to pick up and use a remote. It would be hard to find someone who had not either spilled a drink or dropped a remote, by virtue of the continual shuffling or reaching for a cup or a remote while watching his or her favorite program.

For those using reclining chairs, the number of times one bends forward to put down a cup to pick up a remote or vice versa is only a guess, but such bending probably occurs thousands of times during a lifetime. The propensity for accidental spillage by continually fumbling or shuffling between remote control and cup or glass is great. The potential for pain or injury due to continually bending forward, particularly for the aged or infirm, when needing to set down one item to pick up another is not only great, but even sometimes dictates how viewers position and select their furniture. The viewer with only one hand is the most adversely affected by virtue of his or her condition.

A downside to consuming food and beverage while watching television results from the length of time which passes while engaged in doing so. Because the activity is often one of leisure, with many viewers even taking their major meals in front of a television, significant time may pass while viewers watch lengthy program segments, enabling a hot drink to cool or a cool drink to warm.

What is needed then is a device which allows a viewer to hold a beverage and operate a remote control using the same hand. The device should also keep a beverage palatable for a substantial length of time.

SUMMARY OF THE INVENTION

The present invention provides a container for the consumption of hot or cold beverages with an integral remote controller capable of operating an entertainment center, television or other system without the necessity of the operator putting down his or her beverage.

The container holding the beverage is held in an insulated sleeve to maintain the desired beverage temperature, and the keypad is positioned for easy operation on the operational end of the device's handle. The container is removably affixed to a base extending from the base end of the handle. The extending base has a removable upper plate allowing access to a cavity that extends from the base into the handle and houses batteries and circuitry of the remote controller. The infrared emitter is located either in an aperture along an edge of the base of the device permitting ease of pointing the emitter, or on the sleeve itself.

Another embodiment comprises an insulated sleeve and container device where the remote controller is integral with the sleeve, without the handle or base.

The ability to direct the emitter via a handle and base is very convenient for the user. Coupled with the convenience of detachable containers for removal for cleaning, the embodiment depicted in the drawings, having a handle, a separate base and a sleeve is considered to be the best mode of the present invention.

The device can employ a universal remote for controlling a complete entertainment center, television or even household environmental and lighting control systems. In fact, the mode of operation of the remote control is not critical to Applicant's invention. The remote can transmit radio, infrared or other signals, and may be hand or voice operated.

BRIEF DESCRIPTION OF THE DRAWINGS

FIG. 1 is a perspective view of the device showing the cup and integral handle and base.

FIG. 3 is a cross section of the insulated sleeve.

DETAILED DESCRIPTION OF THE INVENTION

Figure 2:
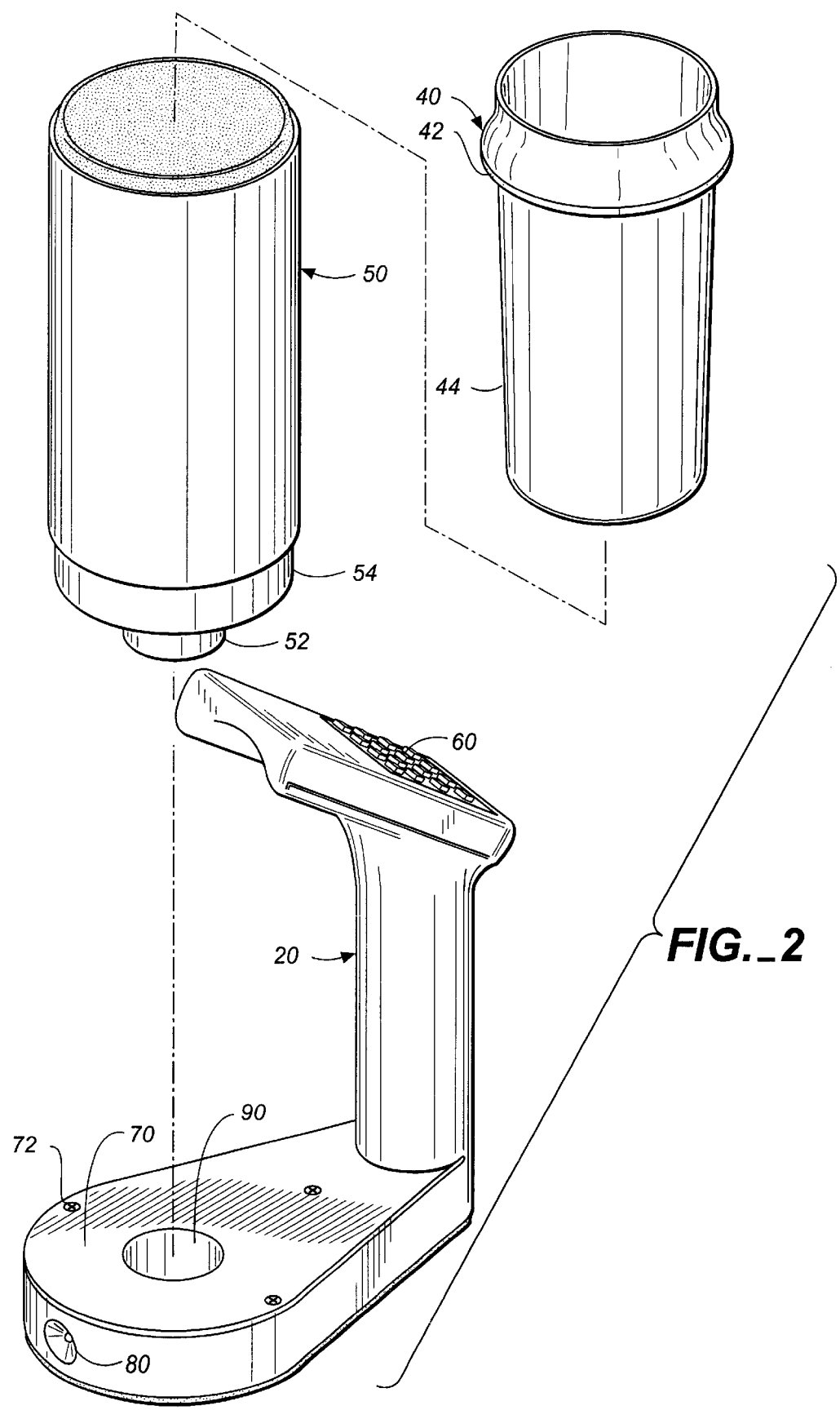
FIG. 2 is an exploded view showing how the cup and insulating sleeve are oriented and affixed to the base/handle combination.

The present invention 10 is a beverage holder that includes a combined handle and base 20 as shown in FIG. 1 providing support for an insulated cup assembly 30 and a remote control pad 60. The remote control pad 60 is either molded directly into the combined base and handle 20, or may simply be affixed to it. The technology of molding plastic to allow the fashioning of a plastic encased remote control is well known. Nearly every manufacturer of remote controllers utilizes such technology, yet has not employed the novel configuration and combination of the present invention. Commonly, receptacles for keys are molded into some kind of assembly and a plate with keys is positioned such that the keys protrude through the receptacles, or the keypad assembly may simply be axed into a receptacle, with the wiring routed as desired. In the preferred embodiment, the combination base and handle 20 comprises thin-walled molded plastic providing a cavity for the electronic circuitry and the batteries necessary to operate the remote. A base plate 70 as shown in FIGS. 1 and 2 is fastened onto the combination base and handle 20. Underneath this base plate 70 is the wiring which connects the keypad 60 and the infrared emitter 80. A power supply is conveniently housed in the handle 20. In the preferred embodiment, screws 72 are utilized as fasteners to secure the base plate 70 to the base and handle 20 in order to facilitate maintenance of the wiring if necessary, and installation of batteries. The particular routing of circuitry and the location of and fastening means for batteries to power said circuitry can be chosen according to those of ordinary skill in the art.

Also located in the base is a male or female fit 90. The corresponding fit 52 is found on the closed end 54 of the insulated sleeve 50. This fit affixes the sleeve 50 to the base 70.

The container 40 slides into the insulating sleeve 50, hiding exterior surface 44. A rolled lip 42 is located on the top edge of the container 40 to facilitate drinking. The insulating sleeve 50 contains either air or an insulating material 56, as shown in the cross section, FIG. 3.

The container 40 is installed in the insulating sleeve 50 to form a cup assembly 30 which is affixed to the handle and base combination. The user may operate the keypad 60 to control a television or other system, while holding the handle 20. The user does not have to pause to set down his or her drink.

Such electronic technology as that just described is well known in the art and does not limit the invention to specific electronics. For example, conventional infrared or any equivalent remote control circuitry, power supply, emitter and keypad may be utilized, and the emitter 80 is ergonomically placed to allow easy and convenient directing of the emitter toward the system to be remotely operated.

While the invention has been described in connection with what is presently considered the most practical and preferred embodiment(s), it is to be understood that the invention is not limited to the disclosed embodiment(s) but, on the contrary, is intended to cover various modifications and equivalent arrangements included within the scope of the appended claims.

What is claimed is:

1. A beverage holder, comprising:
    a base having a front face, a rear face, a top surface, and a bottom surface, the front and rear faces and top and bottom surfaces forming a base enclosure which includes a hollow section, and the top surface including a region in which a container holding a beverage may be disposed;
    a handle having a first end and a second end, disposed in a substantially vertical position and connected at the first end to the enclosure at the rear face of the base, the handle including a hollow section;
    a remote control disposed at the second end of the handle, the remote control operable to generate control signals for a device external to the beverage holder; and
    an emitter disposed in the front face of the base and operable to emit the control signals generated by the remote control.

2. The beverage holder of claim 1, wherein the remote control further comprises:
    means for entering commands used to generate the control signals;
    means for converting the entered commands into the control signals; and
    means for operating the emitter to transmit the control signals.

3. The beverage holder of claim 2, wherein the means for entering commands is a keypad.

4. The beverage holder of claim 2, wherein the means for converting the entered commands and the means for operating the emitter are disposed within the hollow portion of the base, and further wherein the means for entering commands is connected to the means for converting and the means for operating by a connection disposed within the hollow portion of the handle.

5. The beverage holder of claim 1, wherein the remote control is connected to the emitter by a connection disposed within the hollow portion of the handle and base enclosure.

6. The beverage holder of claim 1, further comprising:
    a vessel for holding a liquid disposed in the region of the base.

7. The beverage holder of claim 6, wherein the vessel is removably attached to the base.

8. The beverage holder of claim 6, wherein the vessel further comprises:
    an insulated sleeve disposed within the vessel.

9. The beverage holder of claim 1, wherein the emitter emits infrared signals.

10. The beverage holder of claim 1, wherein the emitter emits radio frequency signals.

11. The beverage holder of claim 2, wherein the means for entering commands is a microphone.

* * * * *